United States Patent
Tremblay et al.

(10) Patent No.: US 10,579,272 B2
(45) Date of Patent: Mar. 3, 2020

(54) WORKLOAD AWARE STORAGE PLATFORM

(71) Applicant: Telefonaktiebolaget LM Ericsson (publ), Stockholm (SE)

(72) Inventors: Benoit Tremblay, Laval (CA); Karol Kozubal, Ottawa (CA); Wubin Li, Kirkland (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 94 days.

(21) Appl. No.: 15/563,688

(22) PCT Filed: Apr. 7, 2015

(86) PCT No.: PCT/IB2015/052510
§ 371 (c)(1),
(2) Date: Oct. 2, 2017

(87) PCT Pub. No.: WO2016/162728
PCT Pub. Date: Oct. 13, 2016

(65) Prior Publication Data
US 2018/0074724 A1   Mar. 15, 2018

(51) Int. Cl.
*G06F 3/06* (2006.01)
*G06F 9/50* (2006.01)
*H04L 29/08* (2006.01)

(52) U.S. Cl.
CPC .......... *G06F 3/0611* (2013.01); *G06F 3/061* (2013.01); *G06F 3/0631* (2013.01);
(Continued)

(58) Field of Classification Search
CPC .... G06F 3/0611; G06F 9/5016; G06F 9/5083; G06F 3/061; G06F 3/0631; G06F 3/0689; H04L 67/1097
See application file for complete search history.

(56) References Cited

U.S. PATENT DOCUMENTS 7,827,146 B1   11/2010  De Landstheer et al.
8,166,257 B1 *  4/2012  Holl, II ................. G06F 13/28
                                                    711/114
(Continued)

OTHER PUBLICATIONS

International Search Report and Written Opinion dated Dec. 8, 2015 for International Application Serial No. PCT/IB2015/052510, International Filing Date: Apr. 7, 2015 consisting of 13-pages.
(Continued)

*Primary Examiner* — Gil H. Lee
(74) *Attorney, Agent, or Firm* — Christopher & Weisberg, P.A.

(57) ABSTRACT

A node is provided. The node includes a receiver configured to receive data from an application. The data includes at least one of an expected workload on a dataset by the application and at least one expected characteristic of the dataset. The node includes a processor. The node includes a memory containing instructions, executable by the processor, that cause the processor to: compare the received data to a multiple storage backend configurations, select a storage backend configuration from the multiple storage backend configurations based on the comparison, cause creation of the dataset in a first storage backend having the selected storage backend configuration, determine performance data associated with at least one of performance of the first storage backend and actual workload on the dataset by the application, and modify at least one storage parameter of the first storage backend based on the determined performance data.

26 Claims, 8 Drawing Sheets

(52) U.S. Cl.
CPC .......... *G06F 3/0689* (2013.01); *G06F 9/5016* (2013.01); *G06F 9/5083* (2013.01); *H04L 67/1097* (2013.01)

(56) References Cited

U.S. PATENT DOCUMENTS

| | | | |
|---|---|---|---|
| 8,352,941 | B1 | 1/2013 | Protopopov et al. |
| 8,458,422 | B1 | 6/2013 | Holdman et al. |
| 8,762,538 | B2 | 6/2014 | Dutta et al. |
| 8,799,322 | B2 | 8/2014 | deMilo et al. |
| 8,806,015 | B2 | 8/2014 | Dutta et al. |
| 2007/0094294 | A1 | 4/2007 | Ellsworth et al. |
| 2011/0276579 | A1 | 11/2011 | Colrain et al. |
| 2012/0233609 | A1 | 9/2012 | Blythe et al. |
| 2013/0054703 | A1 | 2/2013 | Neill et al. |
| 2013/0073702 | A1* | 3/2013 | Umbehocker ........ G06F 9/5016 709/222 |
| 2013/0086324 | A1 | 4/2013 | Soundararajan et al. |
| 2013/0145064 | A1 | 6/2013 | Radovanovic |
| 2013/0173805 | A1* | 7/2013 | Bohling ................ G06F 9/5016 709/226 |
| 2013/0205005 | A1* | 8/2013 | Ashok .................... G06F 15/17 709/224 |
| 2013/0290541 | A1* | 10/2013 | Hatasaki ............... G06F 9/5077 709/226 |
| 2014/0047095 | A1 | 2/2014 | Breternitz et al. |
| 2014/0351505 | A1* | 11/2014 | Chiu ........................ G06F 3/061 711/114 |
| 2016/0077750 | A1* | 3/2016 | Erdmann .............. G06F 3/0647 711/114 |

OTHER PUBLICATIONS

Tang et al., "A Self-Organizing Storage Cluster for Parallel Data-Intensive Applications," Published in: Proceedings of the 2004 ACM/IEEE Conference on Supercomputing, (SC'04), pp. 52-64, Date of Conference: Nov. 6-12, 2004, Pittsburgh, PA, USA, consisting of 13-pages.

Narayanan et al., "Continuous Resource Monitoring for Self-Predicting DBMS," Published in: Proceedings of the 13th IEEE International Symposium on Modeling, Analysis, and Simulation of Computer and Telecommunication Systems, (MASCOTS'05), pp. 239-248, Date of Conference: Sep. 27-29, 2005, Atlanta, GA USA, consisting of 10-pages.

Thereska et al., "Informed Data Distribution Selection in a Self-Predicting Storage System," Published in: IEEE International Conference on Autonomic Computing, (ICAC'06), pp. 187-198, Date of Conference: Jun. 13-16, 2006, Dublin, IE, consisting of 12-pages.

S. Kavalanekar et al., "Characterization of Storage Workload Traces from Production Windows Servers," Published in: IEEE International Symposium on Workload Characterization, (IISWC 2008), pp. 119-128, Date of Conference: Sep. 14-16, 2008, Seattle, WA USA, consisting of 10-pages.

A. Moro et al., "Ergodic Continuous Hidden Markov Models for Workload Characterization," Published in: Proceedings of 6th International Symposium on Image and Signal Processing and Analysis,(ISPA 2009), pp. 99-104, Date of Conference: Sep. 16-18, 2009, Salzburg, Austria, consisting of 6-pages.

Nicolae et al., BlobSeer: "Next-Generation Data Management for Large Scale Infrasturures," Published in: J. Parallel Distrib. Comput., vol. 71:159-184, Publication Date: Aug. 21, 2010 consisting of 16-pages.

Pankaj Pipada et al., "LoadIQ: Learning to Identify Workload Phases from a Live Storage Trace," Indian Institute of Science, Bangalore, NetApp, Jun. 13, 2012, Slides 1-39.

Tirardo et al. "Reconciling Dynamic System Sizing and Content Locality through Hierarchical Workload Forecasting," Published in: IEEE 18th International Conference on Parallel and Distributed Systems, (ICPADS 2012), pp. 77-84, Date of Conference: Dec. 17-19, 2012, Singapore, consisting of 8-pages.

J.P.H.M. Hausmans et al., "Two Parameter Workload Characterization for Improved Dataflow Analysis Accuracy," Published in: IEEE 19th Real-Time and Embedded Technology and Applications Symposium (RTAS 2013), pp. 117-126, Date of Conference: Apr. 9-11, 2013, Philadelphia, PA, USA, consisting of 10-pages.

C. Albrecht et al., "Janus: Optimal Flash Provisioning for Cloud Storage Workloads," Published in: USENIX Annual Technical Conference (USENIX ATC '13), pp. 91-102, Date of Conference: Jun. 26-28, 2013, San Jose, CA USA, consisting of 12-pages.

B. Seo et al., "IO Workload Characterization Revisited: A Data-Mining Approach," Published in: IEEE Transactions on Computers, vol. 63:(12):3026-3038, Publication Date: Dec. 12, 2014 consisting of 13-pages.

\* cited by examiner

WORKLOAD AWARE STORAGE PLATFORM

CROSS-REFERENCE TO RELATED APPLICATIONS

This application is a Submission Under 35 U.S.C. § 371 for U.S. National Stage Patent Application of International Application Number: PCT/IB2015/052510, filed Apr. 7, 2015 entitled "WORKLOAD AWARE STORAGE PLATFORM" which is incorporated herein by reference.

TECHNICAL FIELD

The disclosure relates to cloud computing environments, and in particular to optimizing data storage and access in cloud computing environments.

BACKGROUND

Cloud computing environments continue to gain in popularity with numerous types of consumers ranging from global companies to individuals. Storage is a central element in the cloud computing environment. However, storage is also one of the characteristics that makes optimization difficult due to the variety of applications that each have unique performance needs. Applications running in the cloud need to store data for various purposes, but the access patterns by the application to the stored data may vary greatly from application to application; therefore, an optimized system for one application may not be the optimum system for another application. In other words, the workload on the data which may be organized as a dataset by the applications may differ greatly. Dataset as used herein refers to a collection of related or similar data that is used by one or more applications. For example, a collection of movie files for a video streaming service, or collection of files containing tables of a database. Further, the expected performance of the dataset on the storage backend may also vary greatly. For example, video streaming applications read sequentially large video files while a database engine handling online shopping carts for an online store needs to access block information in files that may be situated at different places in the database files, i.e., does not read sequentially large files.

Another characteristic of storage that makes optimization difficult is the expected lifespan of the data stored in the cloud computing environment. The lifespan may vary from application to application. For example, pictures or other media stored in the cloud for archiving purposes are expected to be available for years but are seldom accessed. In another example, an online shopping cart may need multiple accesses during an online transaction, but the online shopping cart may be deleted once the transaction is completed, cancelled or expired. Therefore, the lifespan of the data or datasets stored in the cloud computing environment may vary greatly.

Some existing cloud computing environments address the variability in dataset storage access, lifespan and workload generated by an application by providing specific storage solutions designed to work well with a specific type of dataset and workload. One example of an existing storage solution is a Hadoop Distributed File System (HDFS). The HDFS provides good performance for supporting big data collections and analytics, but performance suffers for high performance random read/write access that is required for supporting real-time application databases used by virtual network functions (VNF).

In other words, depending on the dataset and the associated workload on the dataset by the application, an operator or cloud provider has to select among different existing storage solutions that may provide good performance for certain aspects of the workloads, e.g., supporting big data collections, while possibly providing weak performance for other aspects of the workload, e.g., poor high performance random read/write access. In order to address this problem in existing storage solutions, some vendors deploy storage systems that will cover a wide scope of workload and applications. However, even this "wide scope" storage solutions fail to cover all possible scenarios. For example, this type of storage solution often uses rudimentary workload characterizations based on data access patterns, e.g., least recently used (LRU), etc., for a given set of storage resources to perform tiering between media types within a single storage backend, thereby leading to accuracy and configurability issues.

Moreover, once the dataset has been deployed on a given existing storage solution, it is difficult to move the dataset to another storage solution if the workload pattern changes drastically, e.g., the dataset becomes dormant because the application is retired but the data must be maintained for regulator reasons. Moving the dataset in this situation requires costly manual intervention from the operator to copy data from the current active system to a more passive system. Even if automatic migration is possible, the automatic migration fails to account for workload variations on the system and other cloud computing tenant's needs, thereby negatively impacting overall performance of the storage backend. In current cloud computing environments, the application and not the existing storage solution is responsible for migrating data from high performance to low performance backend tiers when data is less frequently accessed.

Further, other existing cloud computing environments fail to adequately address the variability in dataset access, lifespan and workload generated by an application. For example, these existing cloud computing environments offer a single generic storage solution or a limited choice with different service level agreements (SLAs) at different cost, e.g., use of solid state drive (SSD) or hard disk drive (HDD) for hosting the dataset. While the single generic storage solution or the limited choice of storage solutions may provide an acceptable compromise for most applications, these storage solutions are insufficient for applications requiring more specific performance in other dimension of the storage solution, e.g., high performance read/write access. Therefore, application providers typically will select a specific cloud provider having an offered storage solution that best fits their expected needs. However, such a storage solution will still fall short of being the optimum storage solution.

Further, there is a lack of integration between various backends in the cloud computing environment, the result being the inability to provide seamless cloud storage services such as automatic data migration. Also, once the application is deployed in the cloud computing environment, there are limited tunable parameters that can be adjusted to adapt the performance of the existing storage solution to the possibly changing behavior of the application over time.

SUMMARY

The present disclosure advantageously provides a method, node and system for optimizing data storage and access in cloud computing environments. In one embodiment of the disclosure, a node is provided. The node includes a receiver that is configured to receive data from an application. The data includes at least one of an expected workload on a dataset by the application and at least one expected characteristic of the dataset. The node includes a processor. The node includes a memory containing instructions, executable by the processor, that cause the processor to compare the received data including at least one of the expected workload on the dataset by the application and the at least one expected characteristic of the dataset to a multiple storage backend configurations, and select a storage backend configuration from the multiple storage backend configurations based on the comparison. The instructions, executable by the processor, further cause the processor to cause creation of the dataset in a first storage backend having the selected storage backend configuration, determine performance data associated with at least one of performance of the first storage backend and actual workload on the dataset by the application, and modify at least one storage parameter of the first storage backend based on the determined performance data.

According to one embodiment of this aspect, the at least one expected characteristic of the dataset includes at least one of storage type, expected size and requested durability. According to one embodiment of this aspect, each storage backend configuration defines multiple backend parameters. According to one embodiment of this aspect, the plurality of backend parameters includes at least two of a degree of randomness, read and write bias, block size, Input/Output Operations per Second (IOPS), latency, throughput, dataset size and durability. According to one embodiment of this aspect, causing the creation of the dataset in the first storage backend having the selected backend configuration includes: selecting resources for deploying the first storage backend, and deploying the first storage backend.

According to one embodiment of this aspect, causing the creation of the dataset in the first storage backend having the selected storage backend profile includes: determining whether the first storage backend has available resources to support the dataset. In response to determining the storage backend lacks available resources to support the dataset, determining whether resources of the first storage backend can be increased. In response to determining the resources in the first storage backend can be increased, allocating additional resources to the first storage backend to support the creation of the dataset. According to one embodiment of this aspect, causing the creation of the dataset in the first storage backend having the selected storage backend profile includes: determining whether the first storage backend has available resources to support the dataset. In response to determining the first storage backend lacks available resources to support the dataset, determining whether resources of the first storage backend can be increased. In response to determining the resources of the first storage backend cannot be increased, causing creation of new instance of a first storage backend having available resources to support the dataset.

According to one embodiment of this aspect, the new instance of the first storage backend has the selected storage profile configuration. According to one embodiment of this aspect, causing the creation of the dataset in the first storage backend having the selected storage backend profile includes determining whether the first storage backend has available resources to support the dataset. In response to determining the first storage backend lacks available resources to support the dataset, determining whether resources of the first storage backend can be increased. In response to determining the resources of the first storage backend cannot be increased, selecting a second storage backend configuration to support the dataset, the second storage backend profile being less to support the dataset than the first storage backend configuration.

According to one embodiment of this aspect, causing the creation of the dataset in the storage backend includes determining whether the first storage backend has available resources to support the dataset. In response to determining the first storage backend has sufficient available resources to support the dataset, configuring the available resources for the dataset. According to one embodiment of this aspect, the at least one storage parameter includes at least one of: number of storage tiers for the dataset, number of computing nodes, size of cache, number of interfaces and percentage of active dataset in each tier for the dataset.

According to one embodiment of this aspect, the dataset is stored in at least one of a first tier and a second tier of the first storage backend. The first tier provides greater data access performance than the second tier. The determined performance data indicates a percentage of active dataset of the dataset has increased. The modifying of the at least one parameter includes increasing the percentage of active dataset in the first tier of the first storage backend. According to one embodiment of this aspect, the memory further includes instructions, executable by the processor, that cause the processor to determine additional performance data associated with at least one of performance of the first storage backend and actual workload on the dataset by the application. The additional performance data indicates at least one expected characteristic of the dataset has changed. The instructions, executable by the processor, further cause the processor to cause migration of the dataset to a second storage backend based at least in part on the determined additional performance data.

According to another embodiment of the disclosure, a method is provided. Data from an application is received. The data includes at least one of an expected workload on a dataset by the application and at least one expected characteristic of the dataset. The received data including at least one of the expected workload on the dataset by the application and the at least one expected characteristic of the dataset is compared to a multiple storage backend configurations. A storage backend configuration is selected from the multiple storage backend configurations based on the comparison. Creation of the dataset in a first storage backend having the selected storage backend configuration is caused. Performance data associated with at least one of performance of the first storage backend and actual workload on the dataset by the application is determined. At least one storage parameter of the first storage backend based on the determined performance data is modified.

According to one embodiment of this aspect, the at least one characteristic of the dataset includes at least one of storage type, expected size and requested durability. According to one embodiment of this aspect, each storage backend configuration defines a plurality of backend parameters. According to one embodiment of this aspect, the plurality of backend parameters includes at least two of a degree of randomness, read and write bias, block size, Input/Output Operations per Second (IOPS), latency, throughput, dataset size and durability.

According to one embodiment of this aspect, causing creation of the dataset in the first storage backend having the selected backend configuration includes selecting resources for deploying the first storage backend and deploying the first storage backend. According to one embodiment of this aspect, causing creation of the dataset in the first storage backend having the selected storage backend configuration includes determining whether the first storage backend has available resources to support the dataset. In response to determining the storage backend lacks available resources to support the dataset, determining whether resources of the first storage backend can be increased. In response to determining the resources in the first storage backend can be increased, allocating additional resources to the first storage backend to support the creation of the dataset.

According to one embodiment of this aspect, causing creation of the dataset in the first storage backend having the selected storage backend configuration includes determining whether the first storage backend has available resources to support the dataset. In response to determining the first storage backend lacks available resources to support the dataset, determining whether resources of the first storage backend can be increased. In response to determining the resources of the first storage backend cannot be increased, causing creation of new instance of a first storage backend having available resources to support the dataset.

According to one embodiment of this aspect, the new instance of the first storage backend has the selected storage profile configuration.

According to one embodiment of this aspect, causing creation of the dataset in the first storage backend having the selected storage backend configuration includes determining whether the first storage backend has available resources to support the dataset. In response to determining the first storage backend lacks available resources to support the dataset, determining whether resources of the first storage backend can be increased. In response to determining the resources of the first storage backend cannot be increased, selecting a second storage backend configuration to support the dataset, the second storage backend profile being less optimized to support the dataset than the first storage backend configuration.

According to one embodiment of this aspect, causing creation of the dataset in the storage backend having the selected backend configuration includes determining whether the first storage backend has available resources to support the dataset. In response to determining the first storage backend has sufficient available resources to support the dataset, configuring the available resources for the dataset.

According to one embodiment of this aspect, the at least one storage parameter includes at least one of number of storage tiers for the dataset, number of computing nodes, size of cache, number of interfaces and percentage of active dataset in each tier for the dataset. According to one embodiment of this aspect, the dataset is stored in at least one of a first tier and a second tier of the first storage backend. The first tier provides greater data access performance than the second tier. The determined performance data indicates a percentage of active dataset of the dataset has increased. The modifying of the at least one parameter includes increasing the percentage of active dataset in the first tier of the first storage backend. According to one embodiment of this aspect, additional performance data associated with at least one of performance of the first storage backend and actual workload on the dataset by the application is collected. The additional performance data indicates at least one expected characteristic of the dataset has changed. Migration of the dataset to a second storage backend is caused based at least in part on the determined additional performance data.

According to another embodiment of the disclosure, a node is provided. The node includes a receiver module configured to receive data from an application. The data includes at least one of an expected workload on a dataset by the application and at least one expected characteristic of the dataset. The node includes an optimization module configured to: compare the received data including at least one of the expected workload on the dataset by the application and the at least one expected characteristic of the dataset to a plurality of storage backend configurations, and select a storage backend configuration from the plurality of storage backend configurations based on the comparison. The optimization module is further configured to cause creation of the dataset in a first storage backend having the selected storage backend configuration, determine performance data associated with at least one of performance of the first storage backend and actual workload on the dataset by the application and modify at least one storage parameter of the first storage backend based on the determined performance data.

According to yet another embodiment of the disclosure, a computer readable storage medium storing executable instructions is provided. When the instructions are executed by a processor, the processor is caused to receive data from an application. The data includes at least one of an expected workload on a dataset by the application and at least one expected characteristic of the dataset. The processor is further caused to compare the received data including at least one of the expected workload on the dataset by the application and the at least one expected characteristic of the dataset to a plurality of storage backend configurations. The processor is further caused to select a storage backend configuration from the plurality of storage backend configurations based on the comparison, cause creation of the dataset in a first storage backend having the selected storage backend configuration, determine performance data associated with at least one of performance of the first storage backend and actual workload on the dataset by the application, and modify at least one storage parameter of the first storage backend based on the determined performance data.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
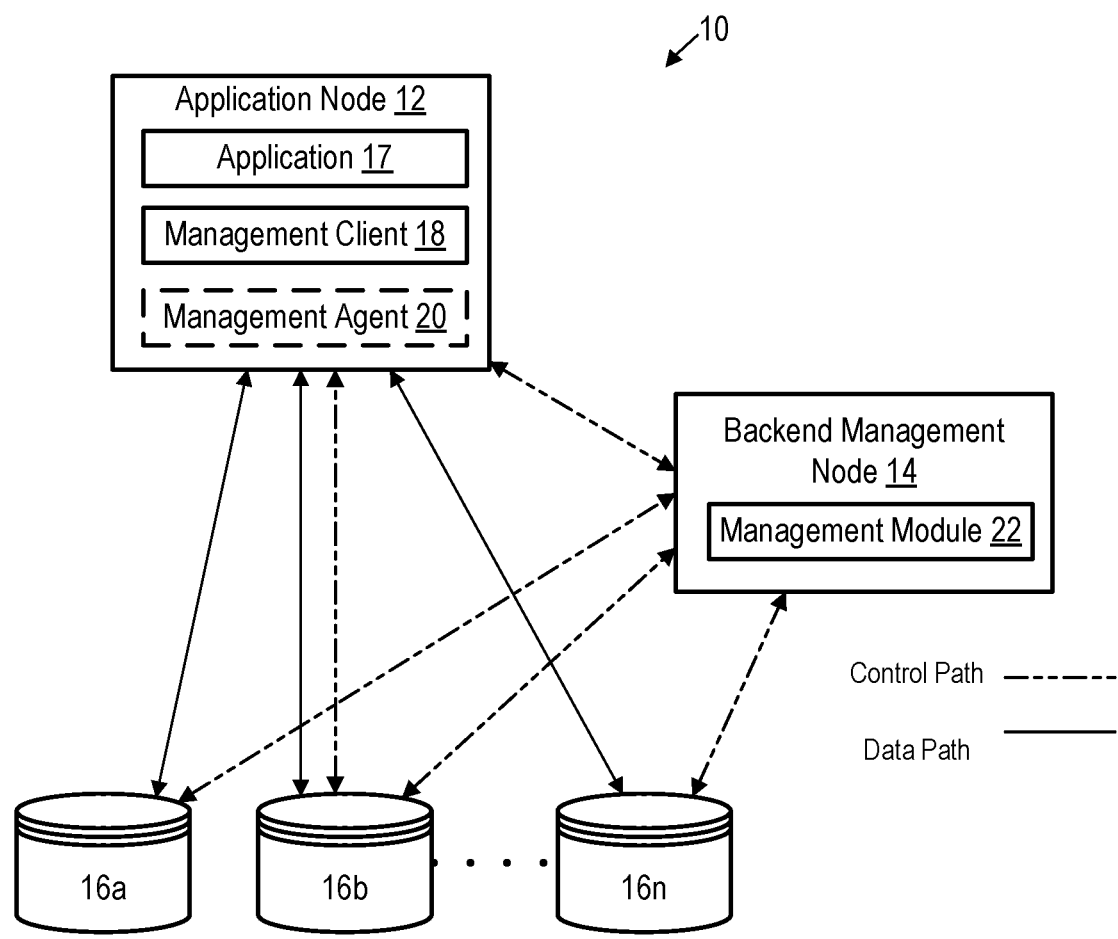
FIG. 1 is a block diagram of an exemplary system for optimizing data storage and access in cloud computing environments in accordance with the principles of the disclosure.

The methods, node and system described herein optimize data storage and access in cloud computing environments. In particular, the disclosure teaches how to take advantage of software defined storage (SDS) solutions to allow applications to specify the expected workload on a given dataset when the dataset is created or when the dataset is used to select a backend solution, i.e., storage solution, to which the dataset will be mapped. SDS solutions rely on most of the functions of the storage solution being implemented in software rather than relying on specialized and expensive hardware. SDS solutions may be deployed over a cluster of commercial off-the-shelf (COTS) servers equipped with a combination of disks (HDD or SSD). In SDS solutions, the cost of equipment used for similar storage capacity is less than the traditional centralized hardware-based solutions while often providing similar performance. In addition, introduction of new features or functions does not require replacement of hardware, but only the deployment of new versions of the software.

In one or more embodiments, a cloud provider may have multiple available storage solutions and be implementing the method, node or system taught by the disclosure. When an application creates a dataset, the application provides the expected characteristics of the workload and the method, node or system taught by the disclosure will select the storage solution by taking into account the resources currently available in the cloud computing environment, i.e., expected performance of the resources. In other words, the method, node or system taught by the disclosure advantageously selects a storage solution from among multiple available storage solutions by taking into account expected characteristics of the workload and resources currently available in the data center. This allows the method, node or system taught by the disclosure to select an available backend solution that is better optimized for the workload and resources than the other available backend solutions.

The expected characteristics of the workload can take the form of predefined workload profiles that can be selected from a list of available workload profiles supported by the cloud provider. In one or more embodiments, the expected characteristics of the workload corresponds to a list of parameters with qualitative and/or quantitative values that will be processed by the method, node or system taught in this disclosure in order to advantageously select an available backend solution that is better optimized for the workload than the other available backend solutions.

In one or more embodiments, after the application has been deployed, the method, node or system taught by the disclosure advantageously monitors the behavior of the application and the performance achieved by the backend solution where the dataset has been created. For example, the behavior of the application may include ratio of reads/writes, size of data, size of operations, etc. Based on the monitoring, the method, node and system taught by the disclosure advantageously adjust one or more tunable parameters of the storage backend to optimize the use the resources and the performance from the application perspective.

In one or more embodiments, the dataset may advantageously be moved to a different backend where there would be an increase in backend performance, change in application behavior and/or change in expected workload, and doing so would provide a better match between storage backend capabilities and the application workload. This arrangement advantageously improves the use of the resources and/or optimizes the system in general. Further, once the method, node and system has determined that the dataset should be created in a selected storage backend, the selected storage backend solution may not yet be deployed on hardware resources or may have insufficient allocated hardware resources to support the creation of the data set. In one or more of these cases, if additional suitable hardware resources are available in the data center, the method, node or system advantageously uses software deployment and configuration automation to allocate the sufficient resources to the storage backend to support the dataset to be created.

The method, node and system taught by the disclosure provide numerous benefits over the existing systems. For example, the method, node and system taught by this disclosure provide a wider range of application workloads than an existing system since the storage backends are dynamically deployed and/or reconfigured to meet the application requirements. This advantageously allows cloud providers to support a wider range of application workloads and to support multiple storage solutions without relying on a single backend. Further, the method, node and system taught by this disclosure provide better usage of resources by matching/mapping the workload/dataset to the appropriate backend. This solves the problems with existing storage solutions where only a generic one-size fits all solution is deployed in which some dimensions of the allocated resources are not fully used because they do not correspond to the application workload, e.g., file read-ahead caching in a random read/write scenario requires disk I/O, bus and memory usage for data that will probably not be used.

Another example of the advantages provided by the method, node and system taught by the disclosure is that the perceived performance for the application is improved by selecting and configuring the backend solution that matches or best maps to the application workload. Further, the method, node and system taught by the disclosure advantageously reduces costs for the cloud provider by more efficiently utilizing the available storage resources, thereby being able to offer the same performance with less resources and/or increasing revenues of the cloud provider by supporting more workloads with the same resources. Also, the method, node and system taught by the disclosure advantageously increases the level of automation in cloud computing environments, thereby reducing the time to deploy storage solutions in the cloud computing environments and accelerating the deployment of applications in the cloud computing environments.

Before describing in detail exemplary embodiments that are in accordance with the disclosure, it is noted that the embodiments reside primarily in combinations of apparatus components and processing steps related to optimizing data storage and access in cloud computing environments. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for optimizing data storage and access in cloud computing environments in accordance with the principles of the present disclosure and designated generally as "10." System 10 includes one or more application nodes 12, backend management node 14 and one or more storage backends 16a-16n (referred to collectively herein as "storage backend 16") in communication with each other. In particular, application node 12 is in communication with backend management node 14 over one or more control paths. In other words, backend management node 14 operates on the control path or plane of system 10 and not on the data path or plane of system 10 such that backend management node 14 communicates with application node 12 and/or storage backend 16 via one or more control paths. In one or more embodiments, application node 12 is in communication with storage backend 16 via both the control plane and data plane.

In one or more embodiments, application node 12 includes one or more applications 17 that may need to store data, i.e., one or more datasets, in storage backend 16. Application node 12 includes management client 18 for communicating with backend management node 14. For example, management client 18 may include one or more application program interfaces (APIs) that are used, in the control plane, to manage datasets, e.g., create, delete, etc., and used, in the data plane, to manipulate data, e.g., create, read, update, delete, etc. For example, management client 18 may request the creation of a dataset as described in FIG. 4. In one or more embodiments, application node 12 includes management agent 20. Management agent 20 controls the storage backend 16 parameters that allow for fine tuning of storage backend 16 when instructed to do so by backend management node 12. Further, management agent 20 allows for monitoring of actual interactions of application 17 with storage backend 16. The information from the monitoring can be used to improve the mapping and/or configuration of the full storage stack, i.e., storage backend 16 as discussed with respect to FIG. 3. For example, if the workload characteristics evolve or change during the lifetime of application 17 from the workload profile that was provided when the dataset was created, the information can be used to modify the mapping and/or configuration of storage backend 16. In other words, management agent 20 allows for the abstracting of interactions between application 17 and storage backend 16. For example, an optimized version of the storage protocol could be deployed in management agent 20 and storage backend 16 without impacting application 17.

Figure 3:
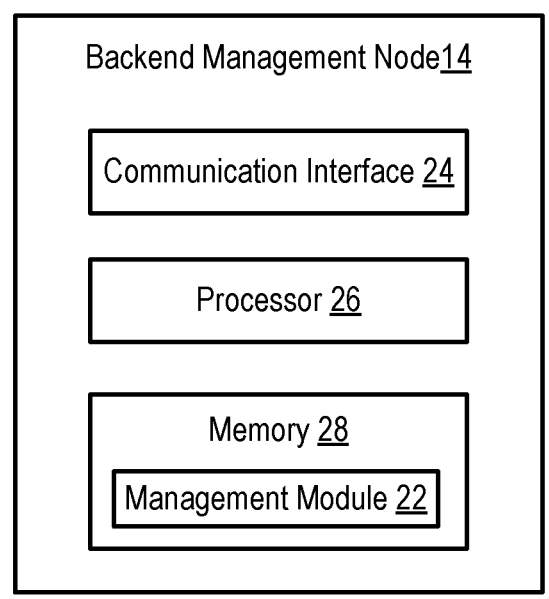
FIG. 3 is a block diagram of an exemplary backend management node in accordance with the principles of the disclosure.
Figure 4:
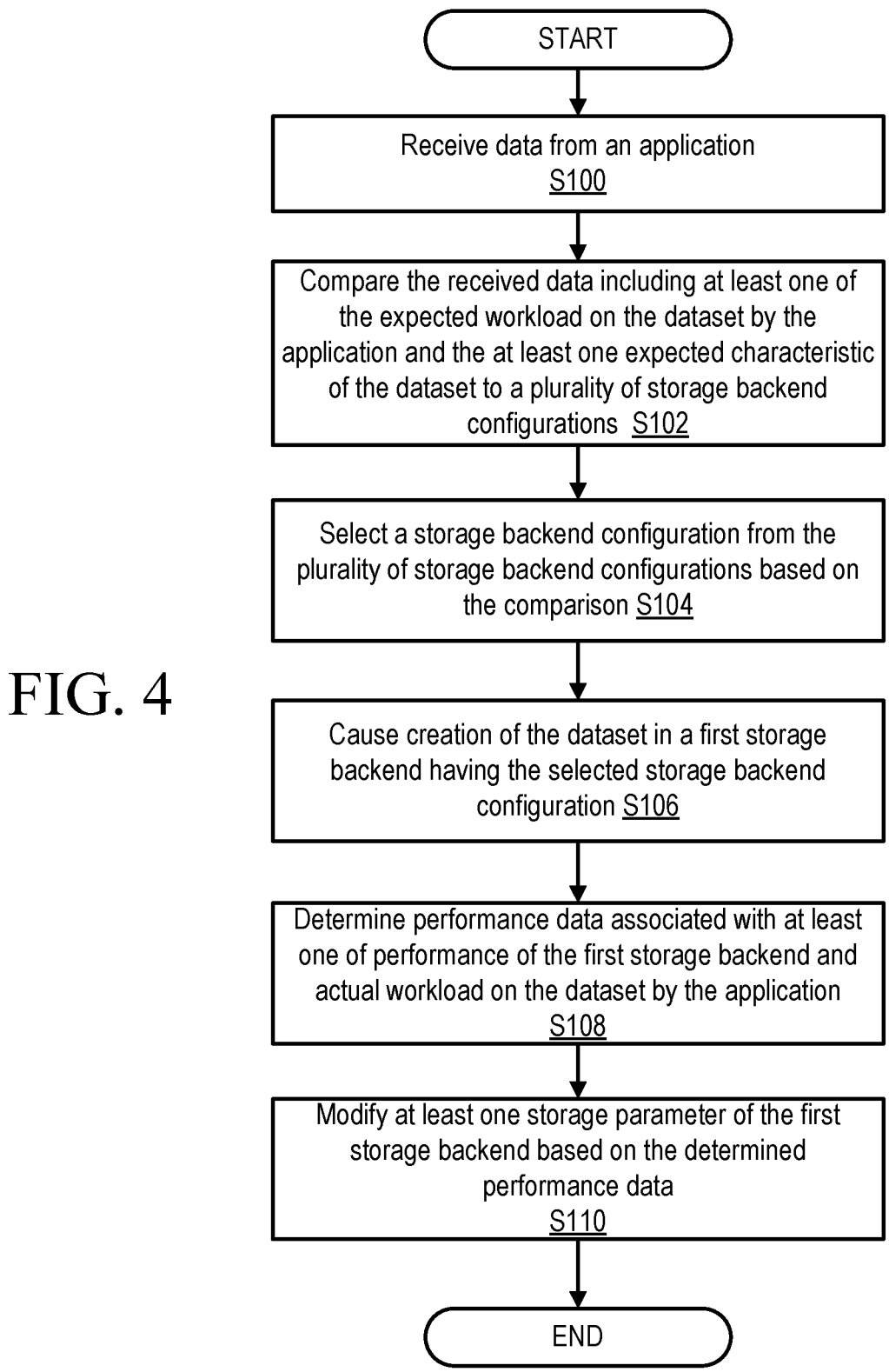
FIG. 4 is a flow diagram of a backend management process of management module in accordance with the principles of the disclosure.

Backend management node 14 includes management module 22 for optimizing data storage and access in cloud computing environments specifically in storage backends 16 of the cloud computing environment, as discussed in detail with respect to FIGS. 3 and 4. Storage backend 16 refers to the software and hardware components that application 17 uses to access one or more datasets stored in the storage backend 16, i.e., storage backend 16 host one or more dataset. Application 17 to dataset relationships may be 1:n, n:1 or m:n, where n and m are integers. In one or more embodiments, storage backend 16 includes software stack (e.g., kernel mode drivers, etc.), hardware (e.g., hardware driver, host bus, etc.) and/or devices (e.g., HDD, SSD, etc.) as is well known in the art. Further, in one or more embodiments, storage backend 16 may include storage tiers, e.g., tier 0-tier 3, where each tier corresponds to respective capacity traits such that each tier has a different capacity trait from the other tiers. For example, tier 0 may have capacity traits corresponding to higher data access performance than tiers 1-3. Tier 0 may be used, for example, for online shopping carts or money transactions, among other services that require high performance from storage backend 16. Tier 1 may have capacity traits for performance optimization that has a data access performance level less than tier 0 but greater than tiers 2 and 3. For example, Tier 1 may be used, for example, for online chats or search functions. Tier 2 may have capacity traits for space optimization that has a lower data access performance level than tiers 0 and 1. For example, tier 2 may be used for email and photo storage and access. Tier 3 may have capacity traits for the lowest data access performance level where Tier 3 may be used, for example, for archiving data. However, multi-tiering, caching, buffering in storage backend 16 varying between SDS solutions storage types and topologies in which the variations may have a significant impact on workload serving capabilities of storage backend 16.

In one or more embodiments, each storage backend 16 controls a set of storage resources that may be different from one storage backend 16 to another storage backend 16. Such storage resources may include non-volatile random access memory (NVRAM), SSDs, HDDs, etc. Further, the quantity of the storage resources may differ from one storage backend 16 to another storage backend 16. In one or more embodiments, storage backend 16 may be a cluster of server nodes in which each server node controls a set of storage devices, e.g., NVRAM, SSD, spinning disk, etc. The cluster of server nodes may be configured different in various embodiments. For example, in one or more embodiments, each server node may have a different set of storage devices. In one or more embodiments, all server nodes may control an equivalent set of storage devices.

Figure 2:
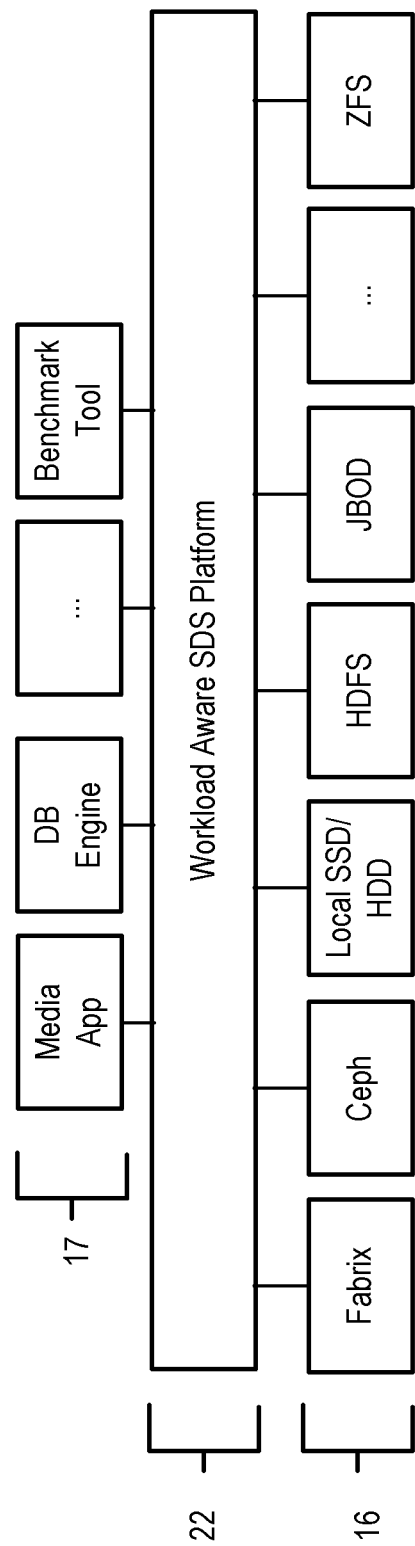
FIG. 2 is a logical diagram of the system for optimizing data storage and access in cloud computing environments in accordance with the principles of the disclosure.

A block diagram of a logical view of system 10 in accordance with the principles of the disclosure is described with reference to FIG. 2. Management module 22 that provides a workload aware SDS platform acts in an intermediary role between applications 17 and multiple storage backends 16 for deploying and managing storage resources in a data center. Each application 17 has a specific workload, e.g., mix, types and rate of operations, and each storage backend 16 is capable of achieving different performance under classes of workload. When application 17 is deployed, application 17 request that backend management module node 14 allocate the storage resources to satisfy its requirements as described herein. By way of non-limiting example, applications 17 may include one or more of a media application, database (DB) engine, benchmark tool and other applications known in the art. Further, storage backend 16 may include one or more of Fabrix based storage, Ceph—Computer Software Configuration Management Tool, local SSD/HDD, Hadoop Distributed File System (HDFS), just a bunch of disks (JBOD) storage, zettabyte file system (ZFS) based storage, Fabrix based system and other type of storage arrangements. For example, Fabrix is a distributed, high performance, scalable and media optimized file system that provides high performance storage for video streaming or streaming of large files.

A block diagram of backend management node 14 in accordance with the principles of the disclosure is described with reference to FIG. 3. Backend management node 14 includes one or more communication interfaces 24 for communicating with application node 12, storage backend 16 and/or other devices, nodes and systems. In one or more embodiments, communication interface 24 is configured to communicate with application node 12 and storage backend 16 over the control plane. In one or more embodiments, communication interface 24 does not communicate with application node 12 and storage backend 16 over the data plane. Backend management node 14 includes one or more processors in communication with communication interface.

Backend management node 14 includes memory 28 that is configured to store one or more modules and data associated with system 10. Memory 28 may include non-volatile and volatile memory. For example, non-volatile memory may include a hard drive, flash memory, programmable integrated circuits, memory stick, solid state memory and the like. Also, volatile memory may include random access memory and others known in the art. Memory 28 stores program instructions such as those for management module 22. For example, management module 22 includes instructions, which when executed by processor 26, cause processor 26 to perform the storage backend management process, as discussed in detail with respect to FIG. 4. In one or more embodiments, memory 28 stores one or more mapping tables for selecting a storage backend configuration as described with respect to FIG. 4. In one or more embodiments, backend management node 14 includes a discovery module that is configured to discover the set of available storage backends 16, the performance characteristics of each storage backend 16 and the set of resources for each storage backend 16.

An exemplary flow diagram of a storage backend management process is described with reference with FIG. 4. Data associated with application 17 is received (Block S100). For example, communication interface 26 of backend management node 14 receives data from application 17 of application node 12. In one or more embodiments, the received data may be included in a request to create a data store, i.e., dataset. For example, application 17 may require storage resources to store a new dataset, therefore, application 17 requests that backend management node 14 allocate storage resources to fulfill the storage requirements of application 17. In one or more embodiments, the received data includes at least one of an expected workload on a dataset by application 17, i.e., workload profile, and at least one expected characteristics of the dataset. The expected workload corresponds to how the dataset is expected to be used by application 17. For example, the expected workload may indicate that the dataset will contain files for video content. In another example, the expected workload may indicate that the dataset will store data of customers, one or more video catalogs, and/or other information such as user's comments and recommendations about video material.

In one or more embodiments, the expected workload includes one or more of the following workload characteristics: Input/Output Operations Per Second (IOPS), operation size, bandwidth, latency (average expected, max acceptable latency, latency distribution, etc.), read/write bias (ratio, time/size distribution), sequential/random, predictable/unpredictable, burstiness/sustained, locality (client/function active dataset), blocks/files/objects, periodicity/access frequency, durability, availability, active dataset, change rate, number of active/total clients, expected dataset lifespan and dataset size/growth. The active dataset characteristics may include one or more of file size (e.g., gigabyte (GB)), ratio of files, object and/or blocks of the total dataset being read or written to. The change rate characteristic may include file size, file size change rate, ratio of files, objects and/or blocks of total dataset being created, deleted or updated. The characteristics of the number of active/total clients may include forecast data on a number of clients expected to exert similar workload on the dataset. The expected dataset lifespan characteristic may include an amount of time the dataset will be needed and/or how the dataset will be handled at the end of its lifespan. The dataset size/growth characteristic includes an expected size of dataset at creation and expected growth and/or expected growth rate. In one or more embodiments, at least one expected characteristic of the dataset includes one or more of: expected size, requested durability, storage type, e.g., object storage, file storage, block storage, expected number of requested operations, expected rate of requested operations, accessibility performance requirements and other characteristics of the dataset. Object storage refers to a dataset that is a collection of objects in the same namespace or a collection defined by metadata attributes(s) such as storage pool, owner, label, etc. File storage refers to a dataset that is the file-system, or a collection of files in a file share or namespace. Block storage refers to a dataset that is a block device such as a single physical disk or logical volume in a local topology or a logical unit of storage (LUN) in a centralized or distributed topology.

Processor 26 of backend management node 14 causes the received data to be compared to one or more storage backend configurations, i.e., processor 26 compares the received data including at least one of the expected workload on the dataset by the application and the at least one expected characteristic of the dataset to a plurality of storage backend configurations (Block S102). In one or more embodiments, processor 26 compares the expected workload on the dataset to one or more predefined application workload classes. For example, the one or more predefined application workload classes include one or more of: database, online transaction processing (OLTP), video stream cache, data backup, system boot, virtual memory (disk paging), big data analytics and other classifications. Each classification defines one or more workload parameters such as block size, read/write ratio and degree of randomness, performance characteristics and/or among other parameters. Performance characteristics may include one or more of: performance level for specific applications 17, scalability, throughput, large file performance, small file performance, degree of randomness performance and other characteristics related to performance of one or more storage backend configurations under specific workloads.

For example, a first storage backend configuration corresponds to a workload class that provides high performance for video streaming applications, i.e., high performance for sequential reads of large files but lower performance at random reads/writes for small files. In another example, a second storage backend configuration corresponds to a workload class that provides better performance for both large file and small file reads/writes than the first storage backend configuration, but is limited to a single node, thereby providing limited scalability for a given dataset. In yet another example, a third storage backend configuration corresponds to a workload class that provides average performance under a generic workload, but scales better than the second storage configuration and provides better performance for various reads/writes than the first storage configuration. The disclosure is not limited to these classes.

In one or more embodiments, the workload parameters for each classification are defined as shown in Table 1, illustrated below. In one or more embodiments, Table 1 is stored in memory 26 of backend management node 14 and/or application node 12. The disclosure is not limited to these classes and may include more or fewer classes than illustrated in Table 1.

TABLE 1

| Predefined Application Workload Class | Block Size (KB) | Read/Write Ratio | Degree of Randomness |
|---|---|---|---|
| Database, OLTP | 8 | 67% Read/33% Write | 100% Random |
| Video stream cache | 1024 | 90% Read/10% Write | Random or Sequential |
| Data backup | 128 | 50% Read/50% Write | 100% Sequential |
| System boot | 64 | 95% Read/5% Write | Sequential |
| Virtual memory (disk paging) | 4 | 50% Read/50% Write | 100% Random |
| Big data analytics | 128 | 95% Read/5% Write | Sequential |

In one or more embodiments, processor 26 compares the at least one expected characteristic of the dataset to one or more predefined application workload classes in table 1. The predefined application workload classes may be modified based on live datasets performance, offline performance tests and/or other situations that create performance data.

After performing the comparison, processor 26 selects a storage backend configuration from multiple storage backend configurations based on the comparison (Block S104). In one or more embodiments, processor 26 categorizes, based on the comparison, the dataset to correspond to a specific predefined application workload classes. Processor 26 then maps the predefined application workload class to one of the multiple storage backend configuration, e.g., Fabrix for video streaming, to a first storage backend configuration, as illustrated in Table 2 below.

TABLE 2

| Predefined Application Workload Class | Storage Backend Configuration |
|---|---|
| Database, OLTP | ZFS |
| Video stream cache | Fabrix |

TABLE 2-continued

| Predefined Application Workload Class | Storage Backend Configuration |
|---|---|
| Data backup | Ceph on HDDs |
| System boot | Ceph on SSDs |
| Virtual memory (disk paging) | ZFS |
| Big data analytics | HadoopFS |

Processor 26 then selects the storage backend configuration, e.g., Fabrix, from the multiple storage backend configurations. In one example where the request relates to transaction processing for a retail store, processor 26 may determine that the request corresponds to the "Database, OLTP" predefined application workload class, thereby mapping the request to the ZFS storage backend configuration.

In an alternative embodiment, selection of a backend configuration is based on cost mapping. For example, workload on a dataset by application 17 is specified as a point or range (volume) in a multi-dimension space in which each dimension corresponds to a property of the workload. Dimensions may include one or more of: sequential (degree of randomness), random (degree of randomness), % read/% write, block size, IOPS, latency, throughput, dataset size, durability (survival to X failures). The expected performance of a respective storage backend configuration is expressed as a function from the multi-dimensional space to the amount of resources required to fulfill the expected workload on the dataset by application 17. By associating a cost to each of those resources, backend management node 14 is able to determine the cost of servicing a given workload by each respective storage backend configuration. Backend management node 14 then selects the storage backend configuration with the lowest cost.

After selected the storage backend 16, processor 26 causes the creation of the dataset in a first storage backend having the selected storage backend configuration (Block S106). In one or more embodiments, backend management node 14 performs one or more determinations before causing creation of the dataset in the first storage backend. For example, Block S106 performs one or more of Blocks S112-126 that are discussed in detail with respect to FIG. 5. Application 17 may then directly access the created dataset without intervention from backend management node 14.

Processor 26 determines performance data (Block S108). In one or more embodiments, the performance data is associated with at least one of performance of the first storage backend 16 where the dataset was created and actual workload on the dataset by application 17. For example, backend management node may collect performance data of workload behavior and the storage backend 16 during the lifetime of the created dataset. The workload behavior may include number and types of operations, among other data. The performance data of storage backend 16 may include the performance level provided by storage backend 16 to which the workload has been allocated, storage backend 16 configuration, and storage backend 16 resources that are dedicated to the workload of application 17 such as number of disks, RAM, CPUs, etc. In one or more embodiments, management agent 20 is responsible for tracing and measuring interactions between application 17 and storage backend 16, and reporting the interactions, i.e., performance data, to backend management node 14.

Processor 26 modifies at least one storage parameter of the first storage backend 16 based on the determined performance data (Block S110). In one or more embodiments, processor 26 makes the determination to modify at least one storage parameter if the performance data, i.e., data on the actual workload on the dataset by application 17, differs from the expected workload on the dataset by application 17. For example, the performance data may indicate that the expected workload has been exceeded, e.g., increase in active dataset of the dataset.

In one or more embodiments, the at least one storage parameter that can be modified, i.e., tunable parameters, includes one or more of: Redundant Array of Inexpensive Disks (RAID) configuration, erasure coding, size of cache of client(s), size of cache of server(s), ratio/balance between tiers, queuing algorithm (single queue, priority queue, queue/(tenant or application or workload), etc.), scheduling algorithm, placement algorithm, number of nodes (multinode backends), number of disks in data pool, rate limiting, a number of storage tiers for the dataset, number of interfaces and percentage of active dataset in each tier for the dataset. For example, the dataset is stored in at least one of a first tier and a second tier of the first storage backend in which the first tier provides greater data access performance than the second tier. Therefore, if the performance data indicates a percentage of an active dataset of the dataset has increased, processor 26 may increase the percentage of active dataset in the first tier of the first storage backend, i.e. modify the at least one storage parameter. In an alternative embodiment, processor 26 may determine to migrate the dataset from the current storage backend 16 to another storage backend 16 in order to modify the parameters. For example, the dataset may need to be migrated to a storage backend 16 that supports larger datasets and that can scale better than the current storage backend 16.

In one example of the storage backend management process of FIG. 4, a data center provider (DCX) provides first storage backend 16*a*, second storage backend and third storage backend 16*c* to be deployed at the data center. These storage backends 16 provide different performance characteristics under different workloads in which each storage backend 16 performs best with specific workloads, but none of the storage backends 16 perform better than the others under all types of workloads. Examples of the three storage backends 16 are as follows:

First storage backend 16*a* performs better than third storage backend 16*c* for video streaming applications that require sequential reads of large files, but performs worse than the second and third storage backends 16*b* and 16*c* for random read/writes of small files. First storage backend 16*a* scales to multiple nodes to be able to sustain high throughput for multiple clients.

Second storage backend 16*b* performs better than the first and second storage backends 16*a* and 16*c* for both large and small files, but is limited to a single node, thereby limiting scalability for datasets.

Third storage backend 16*c* is a generic distributed medium performance storage backend that does not perform as well as the second storage backend 16*b* but is able to scale better than second storage backend 16*b*. Third storage backend 16*c* has much better performance for a mix of read and writes than first storage backend 16*a*.

Continuing the example, application provider A wants to deploy a video application in DCX in which the video application will stream large video files from the cloud computing environment to a large volume of end users. When deploying the video application, application provider A will require the creation of two datasets. Application provider A, via application node 12, requests the creation of a first dataset and indicates in the request that the first dataset will contain files for video content, an expected number of files, distribution of the file sizes, expected number of customers that will use the application and other parameters that describe the first dataset. Backend management node 14 receives the request and uses the information about the first dataset to determine that first storage backend 16*a* is better suited to host the dataset than second and third storage backends 16*b* and 16*c*. The determination is described in detail with respect to Blocks S102 and S104. Further, backend management node 14 allocates several storage servers in the data center to the first dataset since it requires lots of storage resources. Backend management node 14 then deploys and configures the first storage backend on the storage servers to match the requested capacity from application provider A.

The second dataset requested by application provider A is needed to store customer data, video catalog and other information such as users' comments and recommendations about video material. The request from application provider A indicates the second dataset will be used for storing a database, size and approximation of the number of expected transactions on the database. The request further indicates a requirement for high speed access since the second dataset will be served to customers through web access. Based on the information in the request, backend management node 14 determines that second storage backend 16*b* is better suited to provide expected performance than first and third storage backends 16*a* and 16*c*. The determination is described in detail with respect to Blocks S102 and S104. Further, since the data volume is large but still suitable for a single node, backend management node 14 selects the largest storage node available in the data center to deploy the second dataset.

During the lifetime of the second dataset, if backend management node 14 determines the dataset is becoming too large for second backend storage 16*b*, backend management node 14 may migrate the second dataset to another backend that supports larger datasets and that can scale better than second backend storage 16*b*. The determination to migrate the dataset is described in detail with respect to Blocks S108 and S110. In one or more embodiments, the second dataset is migrated to another storage backend 16 that provides lesser performance than second storage backend 16*b*. In this situation where migration causes a reduction in performance, an alarm message can be sent to the data center provider and/or application provider A to get approval for the migration. The disclosure is not limited by to three storage backends and is not limited to two datasets as this example is for illustration purposes. Further, the disclosure is not limited to the performance characteristic arrangement described above.

Figure 5:
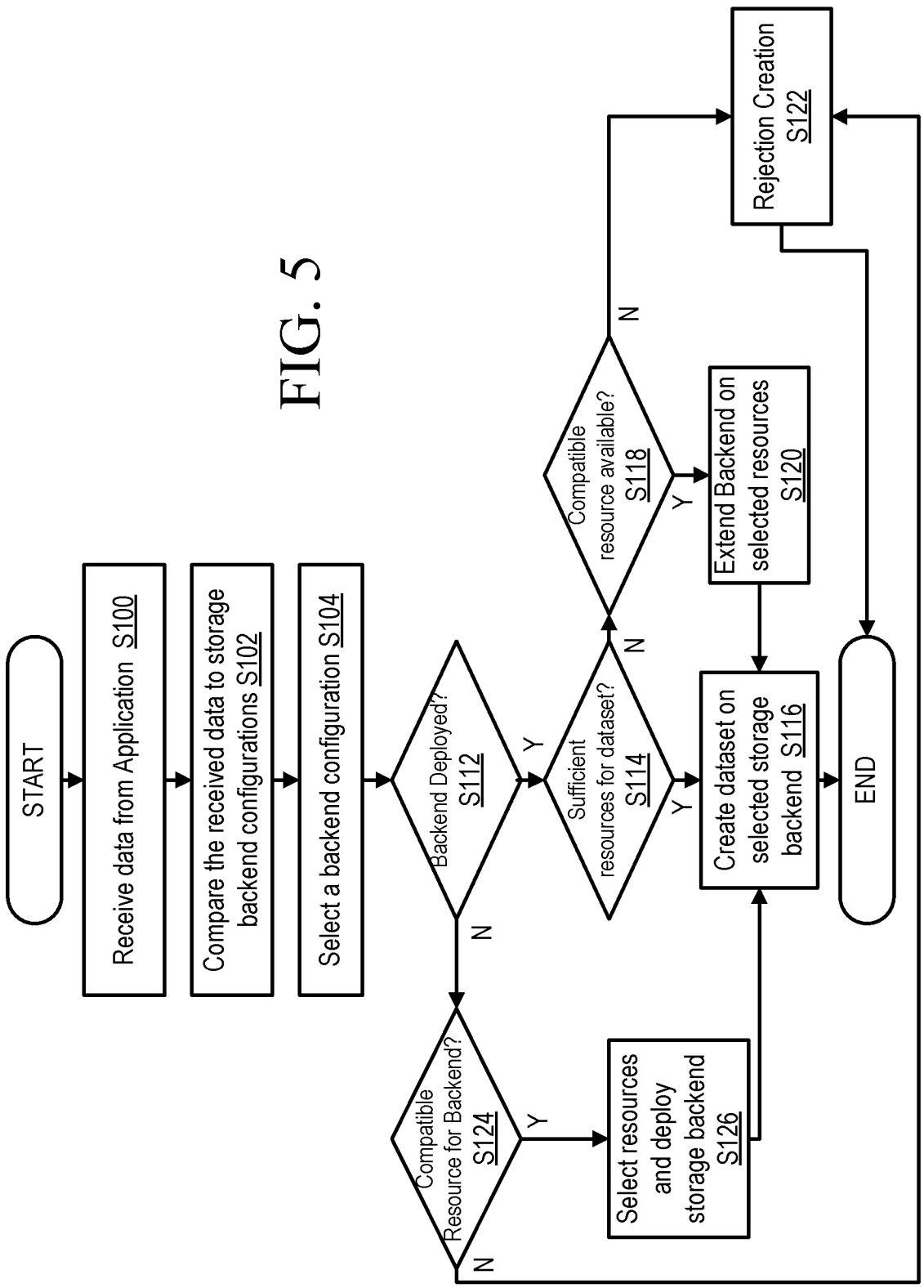
FIG. 5 is a flow diagram of an alternative backend management process of management module in accordance with the principles of the disclosure.

An exemplary flow diagram of an alternative storage backend management process is described with reference with FIG. 5. Blocks S100-S104 shown in FIG. 5 are the same as, and are described in detail with respect to, the corresponding steps in FIG. 4. After selection of a storage backend configuration at Block S104, processor 26 determine whether a storage backend 16 having selected storage backend 16 configuration is deployed in system 10 (Block S112). If storage backend 16 having the selected storage backend configuration is deployed, processor 26 determines whether there are sufficient resources for the dataset in selected storage backend 16, i.e., whether there are enough available resources to create and support the dataset (Block S114). If processor 26 determines there are sufficient resources to create and support dataset, processor 26 causes the creation of the dataset on selected storage backend 16 as discussed in Block S106 (Block S116).

Referring back to Block S114, if processor 26 determines there are not sufficient resources to create and support the dataset in the selected storage backend 16, processor 26 determines whether there are compatible resources available in the cluster (Block S118). For example, backend management node 14 determines whether additional resources from already deployed storage backends 16 are available and can be allocated to create and support the dataset. If processor 36 determines that compatible resources are available in the cluster, i.e., storage backends 16, processor 26 causes selected storage backend 16 to be extended using the compatible resources, i.e., the selected storage backend 16 is configured with the compatible resources (Block S120). A "cluster" as used herein may refer to a multiple server nodes, storage devices and the like where multiple storage software solutions are deployed, thereby partitioning the cluster in sub-clusters, each partition providing a respective storage backend 16. Processor 26 then creates the dataset on selected storage backend 16 that has been "extended" (Block S116).

Referring to Block S118, if processor 26 determines there are no compatible resources available in the cluster, processor 26 rejects the creation of the dataset (Block S122). For example, if storage backend 16 cannot be extended or integrated with more resources, backend management node 14 may have to reject the creation of the dataset. Such a situation to reject the creation of a dataset may be due to the inability of storage backend 16 to be dynamically extended to new allocated resources and/or due to internal storage limits of storage backend 16. In one or more alternative embodiments, if backend management node 14 determines there are no compatible resources available in the cluster, i.e., storage backend 16 cannot be extended, backend management node 14 creates a new instance of storage backend 16 having the selected storage backend configuration with available resources. The new instance of storage backend 16 will be independent of the pre-existing backend instance but provide the same type of performance characteristics. The dataset is then created on the new instance of storage backend 16, thereby avoiding having to reject the creation of the dataset.

Referring back to Block S112, if processor determines selected storage backend 16 is not deployed in system 10, processor 26 determines whether system 10 has compatible resources for storage backend 16 (Block S124). For example, backend management node 14 determines if there are available resources in the cluster, e.g., server nodes, storage devices. Backend management node 14 performs this determination based on its awareness of which software storage solutions can be deployed in system 10 and the hardware configurations of servers that provide one or more storage backends 16. If processor 26 determines compatible and available resources for selected storage backend configuration exists, processor 26 selects the compatible resources and deploys a storage backend 16 having the selected storage backend configuration on the compatible resources (Block S126). In one or more embodiments, deployment of storage backend 16 is performed by backend management node 14 using one or more deploying and configuration automation tools for cloud computing environments that are known in the art such as PXE boot, Chef and Puppet.

Figure 6:
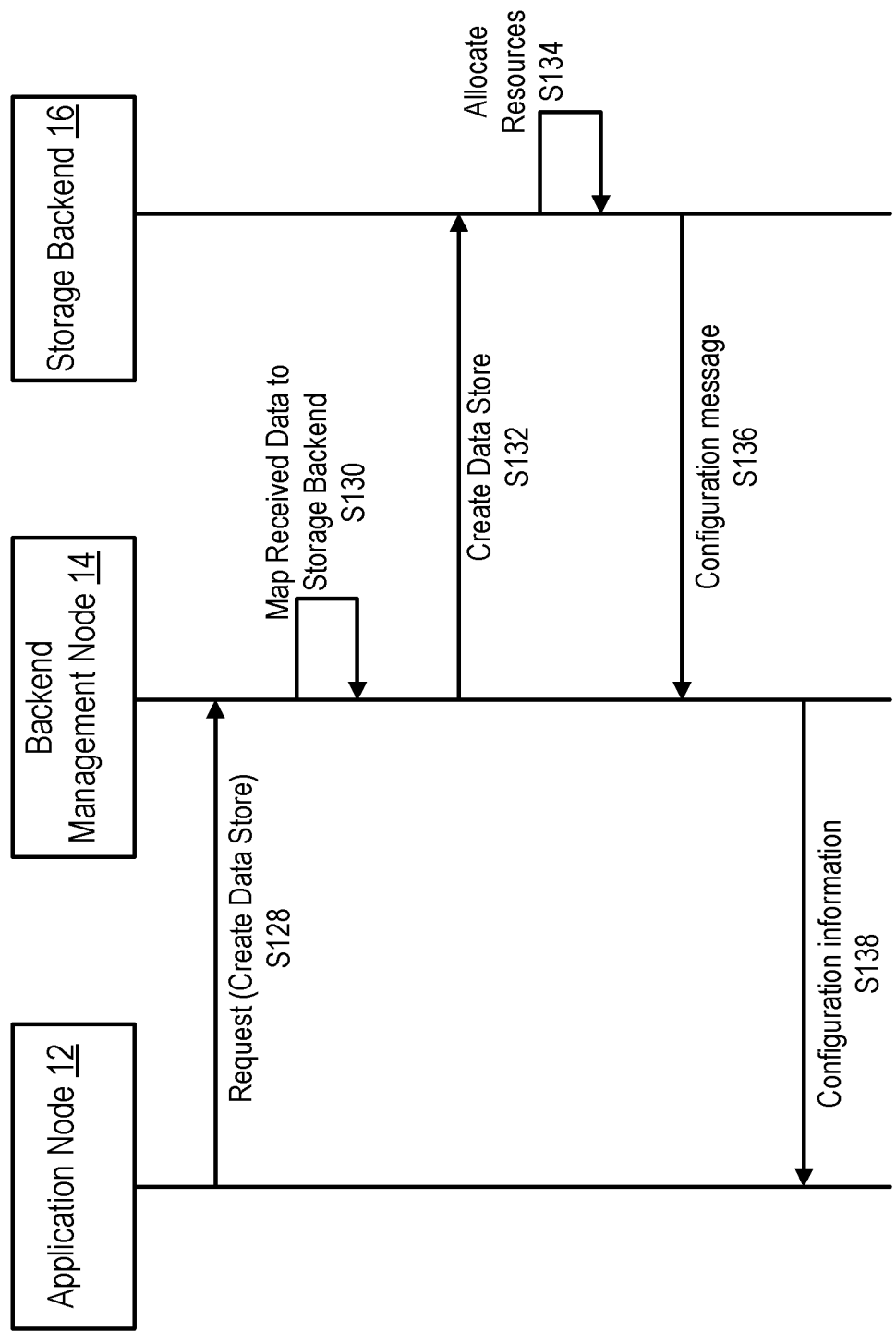
FIG. 6 is an exemplary signaling diagram for creating the dataset in accordance with the principles of the disclosure.

An exemplary signaling diagram for creating the dataset is described with reference to FIG. 6. Application node 12 transmits a request message to backend management node 14 (S128). The request message indicates application node 12 is requesting the creation of a data store and may include data as discussed in detail with respect to S100. Backend management node 14 receives the request message and proceeds to map the received data to storage backend 16 have storage backend configuration (S130). For example, the mapping may include Blocks S102 and S104 discussed above with respect to FIG. 4. Backend management node 14 transmit a create data store message for storage backend 16 to allocate resources for the dataset in a storage backend 16 having storage backend configuration (S132). Storage backend 16 allocates resources for the dataset and returns configuration information to the created dataset via a configuration message (S136). The configuration information may include one or more references to the newly created dataset in which the one or more references will vary depending on the type of dataset created. For example, if creating a block dataset, the reference may be an iSCI target. In another example, if creating a filesystem, the reference may be an NFS export and server address. In yet another example, if creating an object dataset, the reference may be a URL. The reference(s) included in the configuration information is not limited to these examples and may include other data for referencing the newly created dataset. Backend management node 14 forwards the configuration information to application node 12 (S138).

Figure 7:
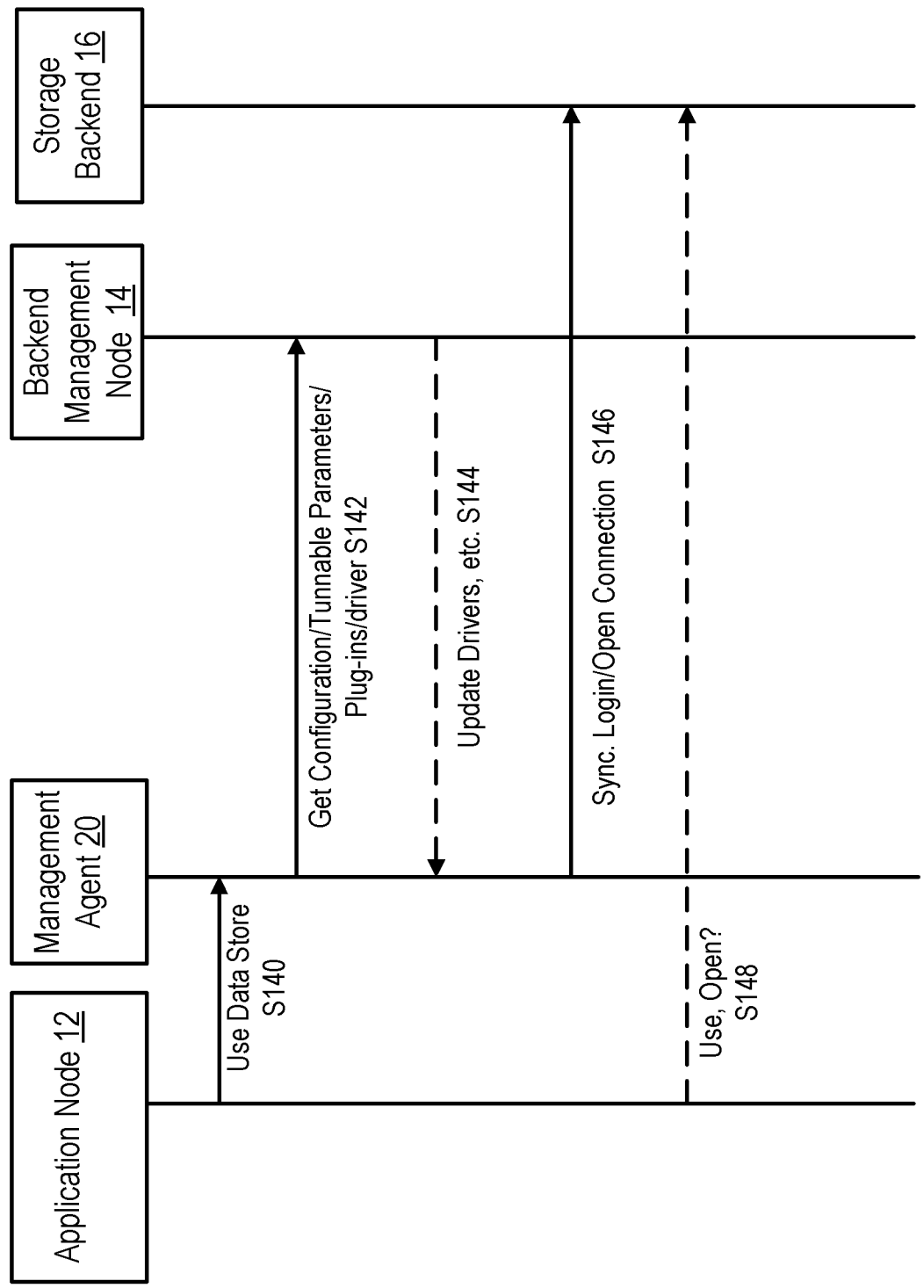
FIG. 7 is an exemplary signaling diagram for initiating the management agent in accordance with the principles of the disclosure.

An exemplary flow diagram for initiating the management agent 20 is described with reference with FIG. 7. Application node 12 sends a message to management agent 20 indicating application 17 is going to use the created data store, i.e., dataset (S140). Management agent 20 causes transmission of a message to request one or more of a storage backend 16 configuration, storage parameter(s), plug-ins, drivers and other information (S142). Backend management node 14 receives the message from the management agent 20 and subsequently transmits the requested information, e.g., update drivers, etc., to management agent 20 (S144). Once the configuration has been established in management agent 20 and storage backend 16, backend management node 14 will not be involved in actual operations and transfer of data between application 17 and storage backend 16. Management agent 20 transmits a sync login/open connection message to storage backend 16 to open the connection (S146). Application node 12 may transmit a message, i.e., "use, open?" message, to storage backend 16 to establish the use of a file, block device or object (S148). For example, when application node 12 requests "use" or "open", application node 12 is either mounting or accessing a target data store. For a block device, "use/open" refers to mounting of a Logical Unit Number (LUN) on Application node 12. For a file or object, "open" refers to reading the file or object.

Figure 8:
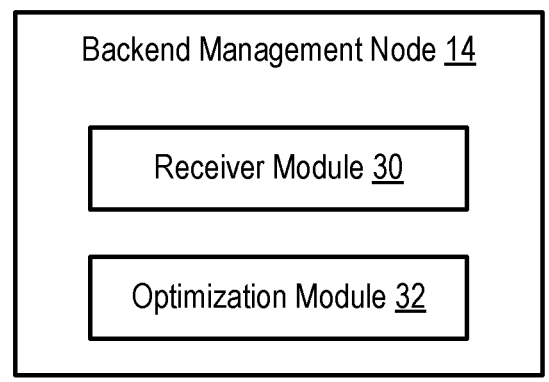
FIG. 8 is an exemplary block diagram of an alternative embodiment of backend management node in accordance with the principles of the disclosure.

An exemplary block diagram of an alternative embodiment of backend management node 14 is described with respect to FIG. 8. Backend management node 14 includes receiver module 30 that performs the receiving process as described in Block S100. Backend management node 14 further includes optimization module 32 that performs the optimization process for determining a storage backend configuration, creating a dataset and modifying storage parameters of storage backend 16 as described with respect to Blocks S102-110.

Therefore, the disclosure advantageously solves the problems with existing cloud computing environments, in part, by controlling a combination of storage backends 16 in which backend management node 14 determines which storage backends 16 perform better than other storage backends 16 under different workloads. Further, when creating a dataset for application 17, the selecting, deploying and/or configuring of storage backend 16 is performed based in part on the storage resources that are available to serve the storage needs for application 17 workload, thereby helping optimize performance. The disclosure further teaches new functionality in cloud computing environments in that resources are optimized by monitoring and automatically modifying resource scheduling, i.e., storage parameters, in order to maintain service level agreements (SLA). The disclosure further solves the problems with existing system by being able to self-learn storage backend 16 behavior under specific workloads through collection and analysis of historical data, thereby allowing backend management node 14 to more accurately select a storage backend configuration that is better optimized to satisfy application 17 workload. Also, the disclosure advantageously teaches the automatic deployment of storage software in hardware nodes, thereby allowing backend management node 14 to deploy software storage backends 16 that better meet the needs of application 17 workload than currently deployed storage backends 16.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the disclosure is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A node, comprising:
   a communication interface, the communication interface configured to receive data from an application, the data including at least one of an expected workload on a dataset by the application and at least one expected characteristic of the dataset;
   a processor; and
   a memory, the memory containing instructions, executable by the processor, that cause the processor to:
   compare the received data including at least one of the expected workload on the dataset by the application and the at least one expected characteristic of the dataset to a plurality of storage backend configurations;
   select a storage backend configuration from the plurality of storage backend configurations based on the comparison;
   cause creation of the dataset in an instance of a first storage backend having the selected storage backend configuration, the causing the creation including:

determining whether the instance of the first storage backend has available resources to support the dataset;

in response to determining the instance of the first storage backend lacks available resources to support the dataset, determining whether the instance of the first storage backend can be dynamically extended by increasing resources of the first storage backend; and in response to determining the resources of the first storage backend cannot be dynamically extended, causing creation of a new software instance of the first storage backend having available resources to support the dataset, the new software instance of the first storage backend being independent of the instance of the first storage backend;

determine performance data associated with at least one of performance of the instance of the first storage backend and actual workload on the dataset by the application; and modify at least one storage parameter of the instance of the first storage backend based on the determined performance data.

2. The node of claim 1, wherein the at least one expected characteristic of the dataset includes at least one of storage type, expected size and requested durability.

3. The node of claim 1, wherein each storage backend configuration defines a plurality of backend parameters.

4. The node of claim 3, wherein the plurality of backend parameters includes at least two of a degree of randomness, read and write bias, block size, Input/Output Operations per Second (IOPS), latency, throughput, dataset size and durability.

5. The node of claim 1, wherein causing creation of the dataset in the instance of the first storage backend having the selected storage backend configuration includes:
selecting resources for deploying the instance of the first storage backend; and
deploying the instance of the first storage backend.

6. The node of claim 1, wherein causing creation of the dataset in the instance of the first storage backend having the selected storage backend configuration further includes:
in response to determining the resources in the instance of the first storage backend can be dynamically extended, allocating additional resources to the first storage backend to support the creation of the dataset.

7. The node of claim 1, wherein the new software instance of the first storage backend has the selected storage backend configuration.

8. The node of claim 1, wherein causing creation of the dataset in the instance of the first storage backend having the selected storage backend configuration further includes:
in response to determining the resources of the instance of the first storage backend cannot be dynamically extended, selecting a second storage backend configuration to support the dataset, the second storage backend configuration being less optimized to support the dataset than the selected storage backend configuration.

9. The node of claim 1, wherein causing creation of the dataset in the instance of the first storage backend further includes:
in response to determining the instance of the first storage backend has sufficient available resources to support the dataset, configuring the available resources for the dataset.

10. The node of claim 1, wherein the at least one storage parameter includes at least one of: number of storage tiers for the dataset, number of computing nodes, size of cache, number of interfaces and percentage of active dataset in each tier for the dataset.

11. The node of claim 1, wherein the dataset is stored in at least one of a first tier and a second tier of the instance of the first storage backend, the first tier providing greater data access performance than the second tier;
the determined performance data indicating a percentage of active dataset of the dataset has increased; and
the modifying of the at least one parameter includes increasing the percentage of active dataset in the first tier of the instance of the first storage backend.

12. The node of claim 1, wherein the memory further includes instructions, executable by the processor, that cause the processor to:
determine additional performance data associated with at least one of performance of the instance of the first storage backend and actual workload on the dataset by the application, the additional performance data indicating at least one expected characteristic of the dataset has changed; and
cause migration of the dataset to a second storage backend based at least in part on the determined additional performance data.

13. A method, comprising:
receiving data from an application, the data including at least one of an expected workload on a dataset by the application and at least one expected characteristic of the dataset;
comparing the received data including at least one of the expected workload on the dataset by the application and the at least one expected characteristic of the dataset to a plurality of storage backend configurations;
selecting a storage backend configuration from the plurality of storage backend configurations based on the comparison;
causing creation of the dataset in an instance of a first storage backend having the selected storage backend configuration, the causing the creation including:
determining whether the instance of the first storage backend has available resources to support the dataset;
in response to determining the instance of the first storage backend lacks available resources to support the dataset, determining whether the instance of the first storage backend can be dynamically extended by increasing resources of the first storage backend; and
in response to determining the resources of the first storage backend cannot be dynamically extended, causing creation of a new software instance of the first storage backend having available resources to support the dataset, the new software instance of the first storage backend being independent of the instance of the first storage backend;
determining performance data associated with at least one of performance of the instance of the first storage backend and actual workload on the dataset by the application; and
modifying at least one storage parameter of the instance of the first storage backend based on the determined performance data.

14. The method of claim 13, wherein the at least one characteristic of the dataset includes at least one of storage type, expected size and requested durability.

15. The method of claim 13, wherein each storage backend configuration defines a plurality of backend parameters.

16. The method of claim 15, wherein the plurality of backend parameters includes at least two of a degree of randomness, read and write bias, block size, Input/Output Operations per Second (IOPS), latency, throughput, dataset size and durability.

17. The method of claim 13, wherein causing creation of the dataset in the instance of the first storage backend having the selected storage backend configuration includes:
selecting resources for deploying the instance of the first storage backend; and
deploying the instance of the first storage backend.

18. The method of claim 13, wherein causing creation of the dataset in the instance of the first storage backend having the selected storage backend configuration further includes:
in response to determining the resources in the instance of the first storage backend can be dynamically extended, allocating additional resources to the first storage backend to support the creation of the dataset.

19. The method of claim 13, wherein the new software instance of the first storage backend has the selected storage backend configuration.

20. The method of claim 13, wherein causing creation of the dataset in the instance of the first storage backend having the selected storage backend configuration further includes:
in response to determining the resources of the instance of the first storage backend cannot be dynamically extended, selecting a second storage backend configuration to support the dataset, the second storage backend configuration being less optimized to support the dataset than the selected storage backend configuration.

21. The method of claim 13, wherein causing creation of the dataset in the instance of the first storage backend having the selected storage backend configuration further includes:
in response to determining the instance of the first storage backend has sufficient available resources to support the dataset, configuring the available resources for the dataset.

22. The method of claim 13, wherein the at least one storage parameter includes at least one of number of storage tiers for the dataset, number of computing nodes, size of cache, number of interfaces and percentage of active dataset in each tier for the dataset.

23. The method of claim 13, wherein the dataset is stored in at least one of a first tier and a second tier of the instance of the first storage backend, the first tier providing greater data access performance than the second tier;
the determined performance data indicating a percentage of active dataset of the dataset has increased; and
the modifying of the at least one parameter includes increasing the percentage of active dataset in the first tier of the instance of the first storage backend.

24. The method of claim 13, further comprising:
collecting additional performance data associated with at least one of performance of the instance of the first storage backend and actual workload on the dataset by the application, the additional performance data indicating at least one expected characteristic of the dataset has changed; and
causing migration of the dataset to a second storage backend based at least in part on the determined additional performance data.

25. A node, comprising:
a receiver module configured to receive data from an application, the data including at least one of an expected workload on a dataset by the application and at least one expected characteristic of the dataset; and
an optimization module configured to:
compare the received data including at least one of the expected workload on the dataset by the application and the at least one expected characteristic of the dataset to a plurality of storage backend configurations;
select a storage backend configuration from the plurality of storage backend configurations based on the comparison;
cause creation of the dataset in an instance of a first storage backend having the selected storage backend configuration, the causing the creation including:
determining whether the instance of the first storage backend has available resources to support the dataset;
in response to determining the instance of the first storage backend lacks available resources to support the dataset, determining whether the instance of the first storage backend can be dynamically extended by increasing resources of the first storage backend; and
in response to determining the resources of the first storage backend cannot be dynamically extended, causing creation of a new software instance of a first storage backend having available resources to support the dataset, the new software instance of the first storage backend being independent of the instance of the first storage backend;
determine performance data associated with at least one of performance of the instance of the first storage backend and actual workload on the dataset by the application; and
modify at least one storage parameter of the instance of the first storage backend based on the determined performance data.

26. A non-transitory computer readable storage medium storing executable instructions, which when executed by a processor, cause the processor to:
receive data from an application, the data including at least one of an expected workload on a dataset by the application and at least one expected characteristic of the dataset;
compare the received data including at least one of the expected workload on the dataset by the application and the at least one expected characteristic of the dataset to a plurality of storage backend configurations;
select a storage backend configuration from the plurality of storage backend configurations based on the comparison;
cause creation of the dataset in an instance of a first storage backend having the selected storage backend configuration, the causing the creation including:
determining whether the instance of the first storage backend has available resources to support the dataset;
in response to determining the instance of the first storage backend lacks available resources to support the dataset, determining whether the first storage backend can be dynamically extended by increasing resources of the instance of the first storage backend; and
in response to determining the resources of the first storage backend cannot be dynamically extended, causing creation of a new software instance of a first storage backend having available resources to support the dataset, the new software instance of the first storage backend being independent of the instance of the first storage backend;

determine performance data associated with at least one of performance of the instance of the first storage backend and actual workload on the dataset by the application; and modify at least one storage parameter of the instance of the first storage backend based on the determined performance data.

* * * * *